Patented June 6, 1950

2,510,600

UNITED STATES PATENT OFFICE 2,510,600

ETHER-CARBONATES AND POLYMERS

Henry A. Pace, Akron, Ohio, assignor to Wingfoot Corporation, Akron, Ohio, a corporation of Delaware No Drawing. Application June 15, 1946, Serial No. 677,118

12 Claims. (Cl. 260—77.5)

This invention relates to ether-carbonates of organic hydrates, to their method of formation and to their polymers.

It is well-known that it is extremely difficult to prepare organic compounds having two hydroxyl groups attached to the same carbon atom. Such compounds are referred to as being hydrates and are generally prepared from the corresponding carbonyl compound, particularly the aldehyde. Ordinarily, these hydrates are unstable and in water solution are believed to exist in equilibrium with their aldehydes or ketones. It has been discovered that a hydrate may be treated in such a way as to form a highly stable compound having both an ether group and a carbonate group attached to the same carbon atom. It has also been discovered that this same type of ether-carbonate compound may be prepared starting with an aldehyde or hemiacetal. However, in each case it is necessary that the carbon atom alpha to the carbon atom carrying the two hydroxyl groups, in the case of the hydrate, or the aldehyde group in the case of the aldehyde, or alpha to the carbon atom carrying both the ether group and the hydroxyl group in the case of the hemiacetal $$(Y-\underset{\underset{Z}{|}}{\overset{\overset{X}{|}}{C}}-\underset{\underset{O-R_1}{|}}{\overset{\overset{H}{|}}{C}}-OH)$$

carry at least three electro-negative groups.

The ether-carbonates of this invention have the general formula $$Y-\underset{\underset{Z}{|}}{\overset{\overset{X}{|}}{C}}-\underset{\underset{O-R_1}{|}}{\overset{\overset{H}{|}}{C}}-O-\overset{\overset{O}{\|}}{C}-O-R$$

in which R and R₁ are an aliphatic radical including the saturated and unsaturated groups, both substituted and unsubstituted, and in which X, Y and Z are a monovalent electro-negative group. These negative groups are best represented by the halogens, particularly chlorine, as well as bromine. An example of the corresponding hydrate containing halogen is chloral hydrate, CCl₃CH(OH)₂.

Another electro-negative group is one containing a secondary carbon atom and is represented by general formula

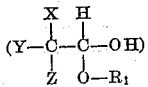

in which A is an electro-negative group. Thus, the electro-negativity of the group

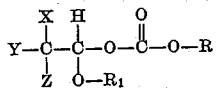

is established through the group represented by A, such as halogen including chlorine and bromine. An example of a corresponding hydrate containing an electro-negative group of this type

is 2,2,3-trichlorobutyral hydrate $$CH_3CH(Cl)C(Cl)_2CH(OH)_2$$

(butyrchloral). An aldehyde containing this secondary carbon negative group

is 2,2,3-trichlorobutyraldehyde, $$CH_3CH(Cl)C(Cl)_2CHO$$

Another electro-negative group is one containing a primary carbon atom and is represented by the general formula

in which A is an electro-negative group, such as halogen including chlorine and bromine. A representative example of a hydrate containing a negative group of this type is 2,2,3-tribromopropional hydrate CH₂BrCBr₂CH(OH)₂.

A general method for the preparation of the hydrates having the general formula

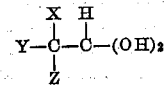

which are used as one of the starting materials in the preparation of the ether-carbonates of this invention, comprises treatment of an aldehyde having the general formula

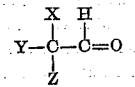

with water at any convenient temperature, e. g., room temperature, and evaporating to remove the water and recover the hydrate. Known hydrates that may be used in the preparation of these ether-carbonates are trichloroacetaldehyde hydrate and 2,2,3-trichlorobutyraldehyde hydrate. A general method for the preparation of aldehydes having the general formula

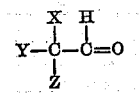

which may also be used as a starting material in the preparation of the ether-carbonates of this invention, comprises the chlorination of ethanol or acetaldehydes; the hydrochlorination, followed by chlorination, of crotonaldehyde and the chlorination of paraldehyde, using the conditions well-known with these methods. Known aldehydes that may be used in this invention are trichloroacetaldehyde and 2,2,3-trichlorobutyraldehyde.

When using the hydrate as a starting material, it has been discovered that the desired ether-carbonate of this invention may be prepared by reacting the hydrate with a halo-formate having the general formula

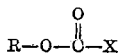

in which X is a halogen. The reaction is best carried out in the presence of a material which will take up the hydrogen halide formed during the reaction. The reaction between the formate and the hydrate is exothermic and therefore the reaction is carried out in apparatus equipped with means for extracting the generated heat and for maintaining a temperature between about 0° C. and about 10° C. Generally it is desirable to place the hydrate, together with the neutralizing agent, as, for example, the tertiary amines such as pyridine, quinoline, triethylamine, etc., which agents operate to take up the hydrogen halide as it is formed, in a vessel and cool the mixture to about 0° C. The formate is then added slowly with constant stirring while maintaining the temperature of the mixture between about 0° C. and about 10° C. The apparatus should be equipped with means for relieving the reaction zone of carbon dioxide which is generated during the reaction. For each mol of hydrate being reacted, a slight excess of formate over the two mols required should be used, together with about two mols of the neutralizing agent. After the reaction is complete, which may take between about 2 hours and about 12 hours, depending upon the conditions of the reaction, the resulting mixture is worked up by diluting with water containing a small amount of hydrochloric acid to remove the pyridine hydrochloride and excess pyridine, washing twice with water, drying with calcium chloride and then recovering the desired product by vacuum distillation in the presence of a polymerization inhibitor, such as copper wire. The desired ether-carbonate is a water-white material having a very slight characteristic (musky) odor.

When using the aldehyde as the starting material, it is first reacted with an alcohol having the general formula ROH, in which R is an aliphatic radical, saturated or unsaturated, at a temperature of between about 25° C. and about 30° C. for a period of time between about 1 hour and about 5 hours to produce the corresponding ether-hydrate or hemiacetal having the general formula

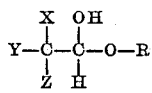

in which X, Y, Z and R are radicals, as previously defined. This ether-hydrate is then reacted with a halo-formate in the presence of a neutralizing agent, above defined, at a temperature between about 0° C. and about 10° C. for a period of between about 2 hours and about 12 hours to produce the desired ether-carbonate. The following examples are illustrative but not limitative of the present invention. Parts, where given, are by weight.

EXAMPLE 1

*1-alloxy-2,2,2-trichlorethyl-allyl carbonate*

A mixture was prepared comprising one mol of chloral hydrate [$CCl_3CH(OH)_2$] and 2.03 mols of pyridine, and cooled to 0° C. To this mixture was added 2.17 mols of allyl chloroformate over a period of 6 hours while maintaining the reaction mixture at a temperature of 5° C.

The resulting reaction mixture was worked up by diluting with water containing .1 mol of hydrochloric acid to remove the excess pyridine and then washing again with water to remove the pyridine hydrochloride formed, drying with calcium chloride and then distilling under vacuum in the presence of 1 gram of copper wire to produce a yield of 85% of 1-alloxy-2,2,2-trichloroethylallyl carbonate having a boiling point of 117–118° C. at 3 mm. The product had a very slight musky odor and was water-white. Analysis of the product showed a chlorine content of 37.1%, index of refraction, $n_D^{24}$ 1.4692, and density, $d_{16}^{27}$ 1.2932.

A quantity of 1-alloxy-2,2,2-trichloroethyl allyl carbonate was heated at 65° C. in the presence of 1% of benzoyl peroxide for 17 hours to produce a resinous mass having a Rockwell hardness of 94.

EXAMPLE 2

*1-alloxy-2,2,3-trichlorobutyl allyl carbonate*

A mixture of one mol of 2,2,3-trichlorobutyral hydrate and two mols of pyridine was cooled to 0° C. and then 2.2 mols of allyl chloroformate was added slowly for a period of 6 hours while maintaining the temperature at 5° C. The resulting mixture was worked up in accordance with the procedure set forth in Example 1 and a yield of 87% of 1-alloxy-2,2,3-trichlorobutyl allyl carbonate was obtained, having a boiling point of 143–144° C. at 5 mm. The product also had an index of refraction, $n_D^{24}$ 1.4764; and density, $d_{16}^{24}$ 1.2609.

A quantity of the 1-alloxy-2,2,3-trichlorobutyl allyl carbonate was heated at 65° C. in the presence of 1% of benzoyl peroxide for 22 hours to obtain a reaction mass having a Rockwell hardness of M 100.

EXAMPLE 3

*1-alloxy-2,2,2-trichlorethyl-allyl carbonate*

To 50 parts of chloral hydrate cooled to 5° C. was added 19.7 parts of allyl alcohol and the solution maintained at room temperature (75° F.) for 2 hours. A near theoretical yield of the hemiacetal chloral allylate [$CCl_3CH(OH)OC_3H_5$] was obtained having a boiling point of 115–116° C., density $d_{16}^{27}$ 1.3701 and an index of refraction, $n_D^{27}$ 1.4832.

To a cooled mixture of 51.4 parts of chloral allylate and 21 parts of pyridine was slowly added 50 parts of allyl chloroformate during a period of 35 minutes while maintaining the mixture at a temperature of about 10° C. and during constant stirring. The reaction mass was then allowed to warm up to room temperature (75° F.) and agitated at this temperature for 1½ hours. The resulting mass was worked up in accordance with the procedure set forth in Example 1 and a 90% yield of the desired product was obtained, having a boiling point of 119° C. at 3 mm., an index of refraction, $n_D^{24}$, 1.4692 and density, $d_{16}^{25}$ 1.2934.

EXAMPLE 4

1 - beta - chloralloxy - 2,2,3 - trichlorobutyl-beta - chlorallyl carbonate

A mixture of 100 parts of 2,2,3-trichlorobutyral hydrate and 85 parts of pyridine was cooled to 0° C. and then 180 parts of beta-chlorallyl chloroformate was slowly added over a 5 hour period while maintaining the temperature of the mixture at about 0° C.–5° C. The resulting mixture was worked up in accordance with the procedure set forth in Example 1 and a yield of 85% of 1 - beta - chloralloxy - 2,2,3 - trichlorobutyl-beta-chlorallyl carbonate was obtained, having a boiling point of 170–175° C. at 2 mm., an index of refraction, $n_D^{27}$ 1.4950 and a density, $d_{16}^{26}$ 1.4010.

A quantity of the 1-beta-chloralloxy-2,2,3-tricholorbutyl-beta-chlorallyl carbonate was heated at 65° C. in the presence of 1% of benzoyl peroxide for 8 hours to obtain a reaction mass having a Rockwell hardness of M 100.

EXAMPLE 5

1-alloxy-2,2,2-trichloroethyl-beta-chlorallyl carbonate

To a solution of 205 parts of chloral allylate [$CCl_3CH(OH)OC_3H_5$] prepared by reacting chloral hydrate with allyl alcohol, in 82 parts of pyridine, was slowly added 175 parts of beta-chlorallyl chloroformate at 0° C. After stirring for a few hours the product was washed with water, dried over calcium chloride, and then distilled in the presence of 2 parts of copper wire to produce 1-alloxy-2,2,2-trichloroethyl-beta-chlorallyl carbonate having a boiling point of 137° C./4mm., an index of refraction, $n_D^{26}$ 1.4812 and a density, $d_{16}^{25}$ 1.3837.

A quantity of the 1-alloxy-2,2,2-trichloroethyl-beta-chlorallyl carbonate was heated at 65° C. in the presence of 1% of benzoyl peroxide for 6 hours to obtain a reaction mass having a Rockwell hardness of M 98.

The following compounds were also produced in accordance with the conditions set forth in Example 5:

1-beta - chloralloxy - 2,2,2 - trichloroethyl allyl carbonate (from chloral, beta-chloroethyl alcohol and allyl chloroformate) having a B. P. 138°/6 mm.; $n_D^{26}$ 1.4818 and $d_{16}^{26}$ 1.3815. Also 1-beta-chloralloxy-2,2,2-trichloroethyl -1- beta-chlorallyl carbonate (from chloral, beta-chlorallyl alcohol and beta-chloroallyl chloroformate) was produced having a B. P. 151° C./4 mm.; $n_D^{25}$ 1.4926 and $d_{16}^{26}$ 1.4569.

1 - beta-chloralloxy - 2,2,3 - trichlorobutyl - 1-allyl carbonate (from 2,2,3-trichlorobutyraldehyde, beta-chloroallyl alcohol and allyl chloroformate) was also prepared having a B. P. 155° C./3 mm.; $n_D^{30}$ 1.4833 and $d_{16}^{30}$ 1.3317.

The halo-formates that may be used in the preparation of these ether-carbonates are those having the formula

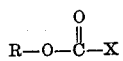

in which R is an aliphatic radical, for example, allyl, methallyl, chlorallyl, e. g. beta chlorallyl, ethyl, crotyl, methyl, butyl, and vinyl. In general, these halo-formates are prepared by reacting phosgene (chloroformyl chloride) with an alcohol (ROH), above described, at room temperature with or without the aid of a catalyst and with or without the aid of heat, depending, of course, upon the particular alcohol being reacted. The use of a catalyst and heat will speed up the chemical reaction. Vinyl chloroformate may be produced by pyrolyzing ethylene glycol bis (chloroformate) at a temperature of 400–600° C., as more fully described in U. S. 2,377,085.

It has been discovered that resinification to a hard glass-like resinous mass occurs only with those compounds in which the ether and the carbonate groups are derivatives of allyl alcohol. For example, 1-alloxy-2,2,2-trichlorethyl allyl carbonate and 1-alloxy-2,2,3-trichlorobutyl allyl carbonate both polymerize easily to hard, clear, glass-like solids. Where the ether and the carbonate groups are derivatives of methallyl alcohol, ethyl alcohol, crotyl alcohol, etc., and where at least one of the groups contains a methylene radical, these compounds resinify under the influence of heat and a catalyst to a highly viscous liquid or at best to a very soft gel.

The allyl type of ether-carbonate copolymerizes readily to desirable commercial resins with another polymerizable compound when using conditions of polymerization similar to those used with respect to the formation of the polymer. The beta chlorallyl ether-carbonate is especially valuable as a copolymerizing monomer. The copolymerization may also be accelerated by the usual catalysts, such as hydrogen peroxide, benzoyl peroxide, tetralin peroxide and lauroyl peroxide, as well as by increasing the temperature, pressure, etc. Polymerization and copolymerization may be carried out at any temperature from about 20° C. to about 100° C. Desirable results are obtained when operating at a temperature between about 50° C. and about 70° C. As examples of polymerizable unsaturated compounds having a terminal methylene group ($CH_2:C=$) may be mentioned esters of acrylic acid, e. g., methyl acrylate, methyl methacrylate, ethyl acrylate, allyl acrylate, methallyl acrylate, chlorallyl acrylate, ethyl methacrylate, methyl chloracrylate, chlorallyl chloracrylate, propyl acrylate, isopropyl acrylate, butyl acrylate, isobutyl acrylate, phenyl acrylate, benzyl acrylate, aryl ethylenes, e. g., styrene, methyl styrene, chlorostyrene, tolyl ethylene, bromo tolyl ethylene; vinyl esters, e. g., vinyl acetate, vinyl propionate, vinyl butyrate, vinyl isobutylate, vinyl valerate, vinyl cyclopentanoate, vinyl cyclohexanoate, vinyl benzoate, vinyl methyl benzoate; nitrile derivatives of acrylic acids, e. g., acrylonitrile, methacrylonitrile; malonic acids and their esters, e. g., methylene malonic acid; unsaturated alcohol polyesters of saturated aliphatic and aromatic polycarboxylic acids, e. g., diallyl phthalate, diallyl oxylate, dimethallyl oxylate, diallyl succinate, dimethallyl tartrate; ethers, e. g., divinyl ether, diallyl ether, vinyl allyl ether, dimethallyl ether; and ketones, e. g., divinyl ketone, diallyl ketone, and dimethallyl ketone and their mixtures.

Suitable changes may be made in the details of the process without departing from the spirit or scope of the invention, the proper limits of which are defined in the appended claims.

I claim:

1. An ether-carbonate having the general formula

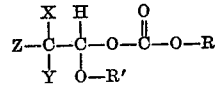

in which R and R' are substituents selected from the group consisting of allyl, methallyl, chlorallyl, vinyl, methyl, ethyl, butyl and crotyl, at least one of the substituents being unsaturated, in which X and Y are monovalent radicals selected from the group consisting of chlorine and bromine and in which Z is a monovalent radical from the group consisting of chlorine, bromine and

in which A is a monovalent radical selected from the group consisting of chlorine and bromine and in which B is a monovalent radical selected from the group consisting of methyl and hydrogen.

2. 1-alloxy-2,2,2-trichloroethyl allyl carbonate.

3. 1-alloxy-2,2,3-trichlorobutyl allyl carbonate.

4. 1-alloxy-2,2,2-trichloroethyl-beta-chlorallyl carbonate.

5. The polymer of an ether-carbonate having the general formula

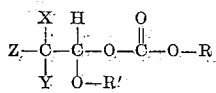

in which R and R' are substituents selected from the group consisting of allyl, methallyl, chlorallyl, vinyl, methyl, ethyl, butyl and crotyl, at least one of the substituents being unsaturated, in which X and Y are monovalent radicals selected from the group consisting of chlorine and bromine, and in which Z is a monovalent radical from the group consisting of chlorine, bromine and

in which A is a monovalent radical selected from the group consisting of chlorine and bromine and in which B is a monovalent radical selected from the group consisting of methyl and hydrogen.

6. The polymer of 1-alloxy-2,2,2-trichloroethyl allyl carbonate.

7. The polymer of 1-alloxy-2,2,3-trichlorobutyl allyl carbonate.

8. The polymer of 1-alloxy-2,2,2-trichloroethyl-beta-chlorallyl carbonate.

9. The method of forming an ether-carbonate which comprises reacting a compound having the general formula

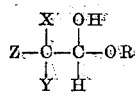

with a chloro-formate having the general formula

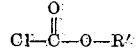

in the presence of an agent capable of neutralizing hydrogen-chloride and at a temperature between about 0° and about 10° C., in which X and Y are monovalent radicals selected from the group consisting of chlorine and bromine, and in which Z is a monovalent radical from the group consisting of chlorine, bromine and

in which A is a monovalent radical selected from the group consisting of chlorine and bromine and in which B is a monovalent radical selected from the group consisting of methyl and hydrogen, in which R is hydrogen and in which R and R' are substituents selected from the group consisting of allyl, methallyl, chlorallyl, vinyl, methyl, ethyl, butyl and crotyl, at least one of the substituents being unsaturated.

10. 1-(beta-chloroalloxy)-2,2,3-trichlorobutyl-beta-chloroallyl carbonate.

11. The polymer of 1-(beta-chloroalloxy)-2,2,3-trichlorobutyl-beta-chloroallyl carbonate.

12. 1-(beta-chloroalloxy)-2,2,3-trichlorobutyl-1-allyl carbonate.

HENRY A. PACE.

REFERENCES CITED

The following references are of record in the file of this patent:

UNITED STATES PATENTS

| Number | Name | Date |
|---|---|---|
| 1,189,205 | Grether et al. | Feb. 6, 1943 |
| 2,321,896 | Britton et al. | June 15, 1943 |
| 2,370,589 | Strain et al. | Feb. 27, 1945 |